United States Patent
Seo et al.

(10) Patent No.: US 9,749,029 B2
(45) Date of Patent: Aug. 29, 2017

(54) METHOD FOR MEASURING STATE OF CHANNEL QUALITY IN WIRELESS COMMUNICATION SYSTEM INCLUDING CELLS FORMED WITH A PLURALITY OF NETWORK NODES, AND APPARATUS THEREFOR

(71) Applicant: LG ELECTRONICS INC., Seoul (KR)

(72) Inventors: Hanbyul Seo, Anyang-si (KR); Kijun Kim, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 14/351,089

(22) PCT Filed: Oct. 11, 2012

(86) PCT No.: PCT/KR2012/008268
§ 371 (c)(1),
(2) Date: Apr. 10, 2014

(87) PCT Pub. No.: WO2013/055126
PCT Pub. Date: Apr. 18, 2013

(65) Prior Publication Data
US 2014/0286280 A1    Sep. 25, 2014

Related U.S. Application Data

(60) Provisional application No. 61/546,031, filed on Oct. 11, 2011.

(51) Int. Cl.
*H04B 7/06* (2006.01)
*H04W 52/42* (2009.01)
(Continued)

(52) U.S. Cl.
CPC ......... *H04B 7/0626* (2013.01); *H04B 17/318* (2015.01); *H04W 52/245* (2013.01); *H04W 52/42* (2013.01); *H04W 52/244* (2013.01)

(58) Field of Classification Search
None
See application file for complete search history.

(56) References Cited

U.S. PATENT DOCUMENTS 8,208,434 B2 * 6/2012 Sayana ................ H04B 7/024
                                                                370/329
2008/0318520 A1   12/2008 Kwun et al.
(Continued)

FOREIGN PATENT DOCUMENTS

| KR | 10-2008-0029912 A | 4/2008 |
| KR | 10-2008-0105831 A | 12/2008 |
| KR | 10-2011-0022152 A | 3/2011 |

*Primary Examiner* — Chi H Pham
*Assistant Examiner* — Vladislav Agureyev
(74) *Attorney, Agent, or Firm* — Birch, Stewart, Kolasch & Birch, LLP

(57) ABSTRACT

Disclosed are a method for measuring a state of channel quality in a wireless communication system including cells formed with a plurality of network nodes and an apparatus therefor. The method of enabling a terminal to measure the state of channel quality in the wireless communication system including the cells formed with the plurality of network nodes, includes the steps of: receiving the information related to a resource in which at least one first type network node transmits a Channel State Information-Reference Signal (CSI-RS); and measuring the intensity of a received signal on only the resource for transmitting the CSI-RS according to at least one first type network node on the basis of the received information.

11 Claims, 11 Drawing Sheets

(51) Int. Cl.
*H04B 17/318* (2015.01)
*H04W 52/24* (2009.01)

(56) References Cited

U.S. PATENT DOCUMENTS

| | | | | |
|---|---|---|---|---|
| 2010/0272032 A1* | 10/2010 | Sayana | ................ | H04B 7/024 370/329 |
| 2011/0051611 A1 | 3/2011 | Chung et al. | | |
| 2011/0141987 A1* | 6/2011 | Nam | ................ | H04L 1/0003 370/329 |
| 2011/0170435 A1* | 7/2011 | Kim | ................ | H04L 5/0023 370/252 |
| 2011/0188481 A1* | 8/2011 | Damnjanovic | ....... | H04W 72/04 370/336 |
| 2011/0194527 A1* | 8/2011 | Lin | ................ | H04B 7/022 370/330 |
| 2011/0237239 A1* | 9/2011 | Chou | ................ | H04W 48/08 455/422.1 |
| 2011/0244877 A1 | 10/2011 | Farajidana et al. | | |
| 2012/0082049 A1* | 4/2012 | Chen | ................ | H04W 24/10 370/252 |
| 2012/0106374 A1* | 5/2012 | Gaal | ................ | H04L 5/0048 370/252 |
| 2012/0113816 A1* | 5/2012 | Bhattad | ................ | H04L 5/0032 370/246 |
| 2012/0113844 A1* | 5/2012 | Krishnamurthy | ..... | H04L 1/0026 370/252 |
| 2012/0120846 A1* | 5/2012 | Hwang | ................ | H04W 24/10 370/254 |
| 2012/0176939 A1* | 7/2012 | Qu | ................ | H04L 5/0023 370/255 |
| 2012/0201163 A1* | 8/2012 | Jongren | ................ | H04W 24/10 370/252 |
| 2012/0207105 A1* | 8/2012 | Geirhofer | ............ | H04L 5/0032 370/329 |
| 2012/0208547 A1* | 8/2012 | Geirhofer | ............ | H04B 7/0626 455/452.2 |
| 2012/0231830 A1* | 9/2012 | Jeong | ................ | H04W 48/12 455/513 |
| 2012/0281567 A1* | 11/2012 | Gao | ................ | H04B 7/0626 370/252 |
| 2012/0282970 A1* | 11/2012 | Kela | ................ | H04W 52/146 455/522 |
| 2013/0003788 A1* | 1/2013 | Marinier | ................ | H04B 7/024 375/219 |
| 2013/0079048 A1* | 3/2013 | Cai | ................ | H04W 48/16 455/517 |
| 2013/0088986 A1* | 4/2013 | Xiao | ................ | H04W 72/0426 370/252 |
| 2013/0208604 A1* | 8/2013 | Lee | ................ | H04L 25/0226 370/252 |
| 2016/0174235 A1* | 6/2016 | Fong | ................ | H04B 7/024 370/329 |

* cited by examiner

FIG. 5
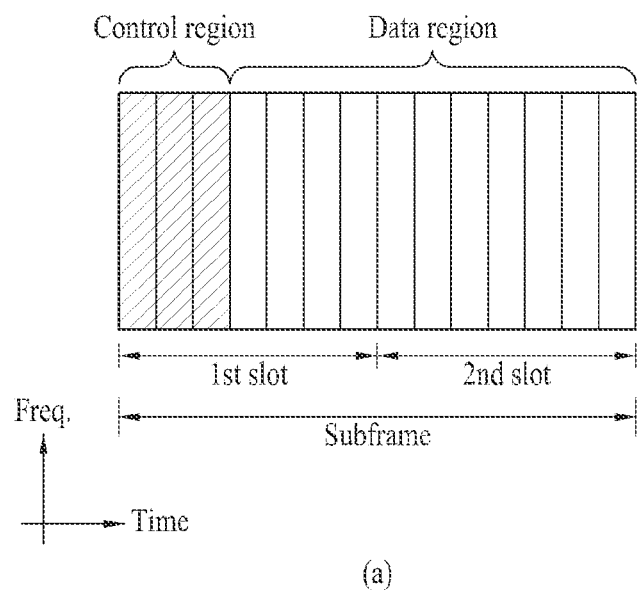
(a)
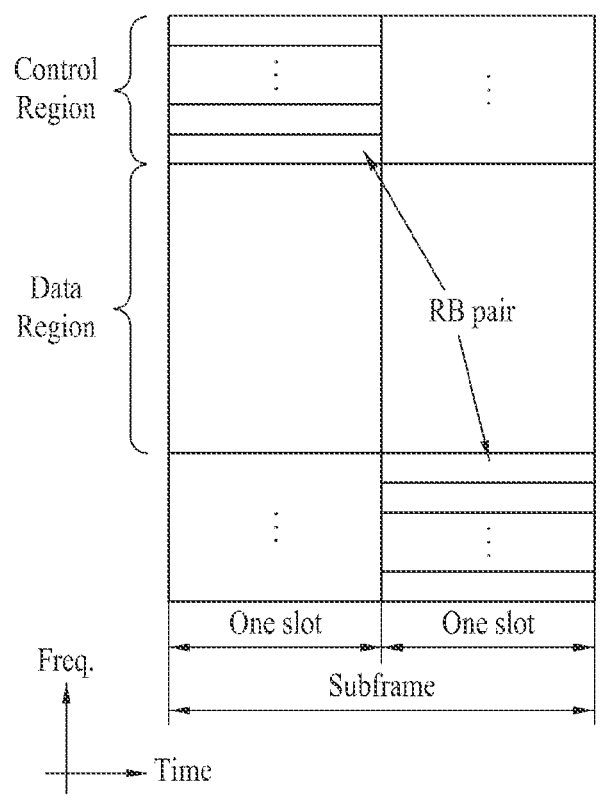
(b)

FIG. 7
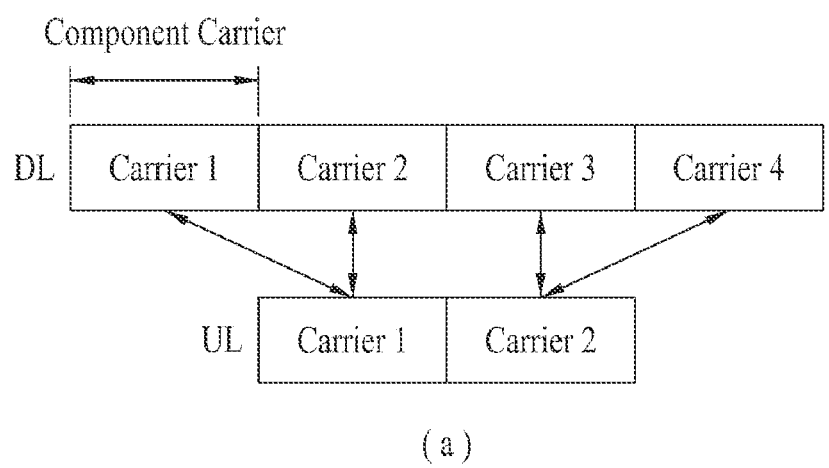
(a)
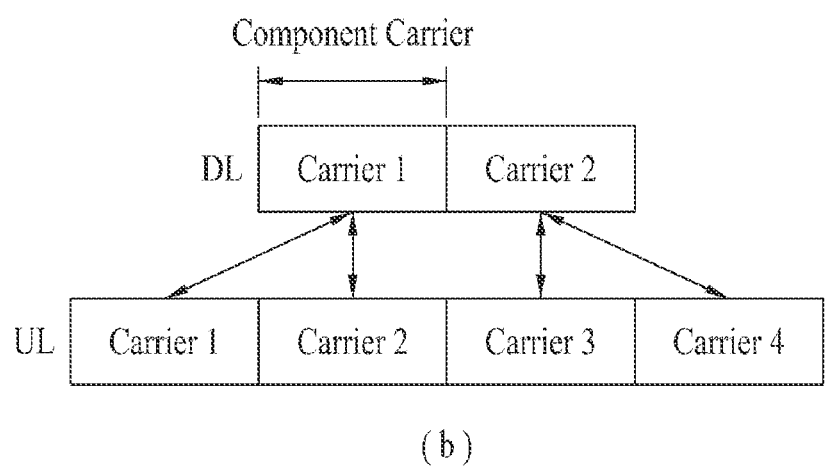
(b)

FIG. 8

FIG. 10

METHOD FOR MEASURING STATE OF CHANNEL QUALITY IN WIRELESS COMMUNICATION SYSTEM INCLUDING CELLS FORMED WITH A PLURALITY OF NETWORK NODES, AND APPARATUS THEREFOR

CROSS REFERENCE TO RELATED APPLICATIONS

This application is the National Phase of PCT/KR2012/008268 filed on Oct. 11, 2012, which claims priority under 35 U.S.C. 119(e) to U.S. Provisional Application No. 61/546,031 filed on Oct. 11, 2011, all of which are hereby expressly incorporated by reference into the present application.

FIELD OF THE INVENTION

The present invention relates to wireless communication, and, more particularly, to a method for measuring a state of channel quality in a wireless communication system including cells formed with a plurality of network nodes, and an apparatus therefor.

BACKGROUND ART

As an example of a communication system to which the present invention may be applied, a 3GPP (3$^{rd}$ Generation Partnership Project Long Term Evolution; hereinafter referred to as 'LTE'), LTE-Advanced (hereinafter referred to as 'LTE-A') communication system will now be broadly described.

FIG. 1 illustrates a general view of an E-UMTS network structure as an example of a communication system.

Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 8 and Release 9 of "3rd Generation Partnership Project; Technical Specification Group Radio Access Network".

Referring to FIG. 1, the E-UMTS includes a User Equipment (UE), base stations (eNode B; eNB), and an Access Gateway (AG), which is located at an end of a network (E-UTRAN) and connected to an external network. The base stations (BSs) can simultaneously transmit multiple data streams for a broadcast service, a multicast service and/or a unicast service.

One or more cells may exist for one BS. One cell is set to one of bandwidths of 1.25, 2.5, 5, 10, 15, and 20 Mhz to provide a downlink or uplink transport service to several UEs. Different cells may be set to provide different bandwidths. Also, one BS controls data transmission and reception for a plurality of UEs. The BS transmits Downlink (DL) scheduling information of downlink data in the corresponding UE to notify information related to time and frequency domains to which data will be transmitted, encoding, data size, and Hybrid Automatic Repeat and reQuest (HARQ). Also, the BS transmits Uplink (UL) scheduling information of uplink data to the corresponding UE to notify information related in time and frequency domains that can be used by the corresponding UE, encoding, data size, and HARQ. An interface for transmitting user traffic or control traffic can be used between the BSs. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon Wideband Code division Multiple Access (WCDMA). However, the demands and expectations of the users and the manufacturers and providers are growing continuously. Also, since other wireless access technologies are constantly being developed, the wireless communication technology is required to newly evolve in order to ensure competitiveness in the future. Accordingly, characteristics, such as reduced cost for each bit, extended service availability, usage of a flexible frequency band, simple structure and open interface, and adequate power consumption of the UE are being requested.

Recently, in 3GPP, standardization procedures for a successive technology of LTE have been carried out. In this specification, the successive technology will be referred to as 'LTE-A'. One of the main differences between an LTE system and an LTE-A system corresponds to a difference in the system bandwidth and the adoption of relay stations.

The LTE-A system is targeted to support a maximum wide band of 100 MHz, and, for this, the LTE-A system is designed to use carrier aggregation or bandwidth aggregation technology that can achieve wide band by using multiple frequency blocks.

In order to use a wider frequency bandwidth, carrier aggregation is designed to use multiple frequency blocks as a single large logical frequency band. The bandwidth of each frequency block may be defined based upon a bandwidth of a system block, which is used in an LTE system. Each frequency block is transmitted by using a component carrier.

Additionally, the reference signal has been newly defined in the LTE-A system. However, detailed research on a method performed by the UE for efficiently and accurately measuring a channel quality state for each network node by using such newly defined reference signal in a wireless communication system including cells configured of multiple nodes has not yet been carried out.

DETAILED DESCRIPTION OF THE INVENTION

Technical Objects

A technical object that is to be achieved in the present invention is to provide a method of a user equipment for measuring a state of channel quality in a wireless communication system including cells formed with a plurality of network nodes.

Another technical object that is to be achieved in the present invention is to provide a user equipment configured to measure a state of channel quality in a wireless communication system including cells formed with a plurality of network nodes.

The technical objects of the present invention will not be limited only to the objects described above, and any other additional technical objects that have not been mentioned in the description will become apparent to those having ordinary skills in the art upon the following description of the present application.

Technical Solution

In order to achieve the above-described technical object, a method of measuring a channel quality state by a user equipment in a wireless communication system including a cell configured of multiple network nodes may include the steps of receiving information related to a resource on which at least one first type network node transmits a Channel State Information-Reference Signal (CSI-RS) within a cell; and measuring intensity of a reception signal for each of the at least one first type network node only within the resource on which the at least one first type network node transmits the CSI-RS based upon the received information. The resource on which the at least one first type network node transmits the CSI-RS may correspond to a specific subframe, at least one specific OFDM (Orthogonal Frequency Division Multiplexing) symbol, or at least one specific RE (Resource Element) unit. The resource on which the first type network node transmits the CSI-RS may correspond to a specific frequency domain within the specific subframe, the at least one specific OFDM symbol, or the at least one specific RE. The at least one first type network node may correspond to a pico BS or a femto BS. The second type network node may correspond to a macro BS type. And, the resource on which the first type network node transmits the CSI-RS may correspond to symbols corresponding to OFDM symbol Indexes 5 and 6 or symbols corresponding to OFDM symbol indexes 9 and 10 within a specific subframe. Additionally, the resource on which the first type network node transmits the CSI-RS may correspond to a subcarrier corresponding to subcarrier indexes 2, 3, 8, and 9 within the symbols corresponding to OFDM symbol indexes 5 and 6 or the symbols corresponding to OFDM symbol indexes 9 and 10.

Meanwhile, the intensity of the measured reception signal may correspond to a Reference Signal Received Power (RSRP) or a Received Signal Strength, Indicator (RSSI) type, and the method may further include the steps of calculating Reference Signal Received Quality (RSRQ) for each of the at least one first type network node by using the measured RSRP or RSSI; and transmitting the calculated RSRQ for each of the at least one first type network node. Additionally, the CSI-RS transmitted by the at least one first type network node and the CSI-RS transmitted by the second type network node may be differentiated from one another for each network node within the cell, and the at least one first type network node corresponds to a node transmitting a signal by using a transmission power lower than a predetermined threshold value, and the second type network node corresponds to a node transmitting a signal by using a transmission power greater than the threshold value. Additionally, the resource having the at least one first type network node transmit the CSI-RS may correspond to a resource configured to transmit a zero power CSI-RS with respect to the second type network node. Moreover, the at least one first type network node and the second type network node may have the same cell Identifier (ID).

In order to achieve the other technical object, a user equipment configured to measure a channel quality state in a wireless communication system including a cell configured of multiple network nodes may include a receiver configured to receive information related to a resource on which at least one first type network node transmits a Channel State Information-Reference Signal (CSI-RS) within a cell; and a processor configured to measure intensity of a reception signal for each of the at least one first type network node only within the resource on which the at least one first type network node transmit the CSI-RS based upon the received information. Additionally, the resource on which the at least one first type network node transmits the CSI-RS may correspond to a resource configured to transmit a zero power CSI-RS with respect to the second type network node. The intensity of the reception signal measured by the processor may correspond to a Reference Signal Received Power (RSRP) or a Received Signal Strength, Indicator (RSSI) type. The processor may be configured to calculate Reference Signal Received Quality (RSRQ) for each of the at least one first type network node by using the measured RSRP or RSSI, and the user equipment may further include a transmitter configured to transmit the calculated RSRQ for each of the at least one first type network node. The processor may differentiate the CSI-RS transmitted by the at least one first type network node from the CSI-RS transmitted by the second type network node and may process the differentiated CSI-RSs.

Effects of the Invention

According to the exemplary embodiments of the present invention, the UE may efficiently measure channel quality for each remote radio head (RRH) based upon a CSI-RS in a cell including a plurality of RRHs, and, as such measurement is reported, the communication performance may be remarkably enhanced.

The effects that may be gained from the embodiment of the present invention will not be limited only to the effects described above. Accordingly, other effects of the present application, which are not mentioned herein, will become apparent to those having ordinary skills in the art.

BRIEF DESCRIPTION OF THE DRAWINGS

The accompanying drawings, which are included to provide a further understanding of the invention and are incorporated in and constitute a part of tins application, illustrate embodiment(s) of the invention and together with the description serve to explain the technical principle of the invention.

FIG. 5 illustrates a structure of a downlink subframe of a 3GPP LTE/LTE-A system, which corresponds to an example of a wireless communication system.

FIG. 7 illustrates an exemplary Carrier Aggregation (CA) communication system.

FIG. 8 illustrates patterns of a CRS and a CSI-RS having 8 ports.

FIG. 10 illustrates exemplary patterns of a CRS and a CSI-RS being transmitted by a specific RRH.

MODE FOR CARRYING OUT THE PRESENT INVENTION

Figure 1:
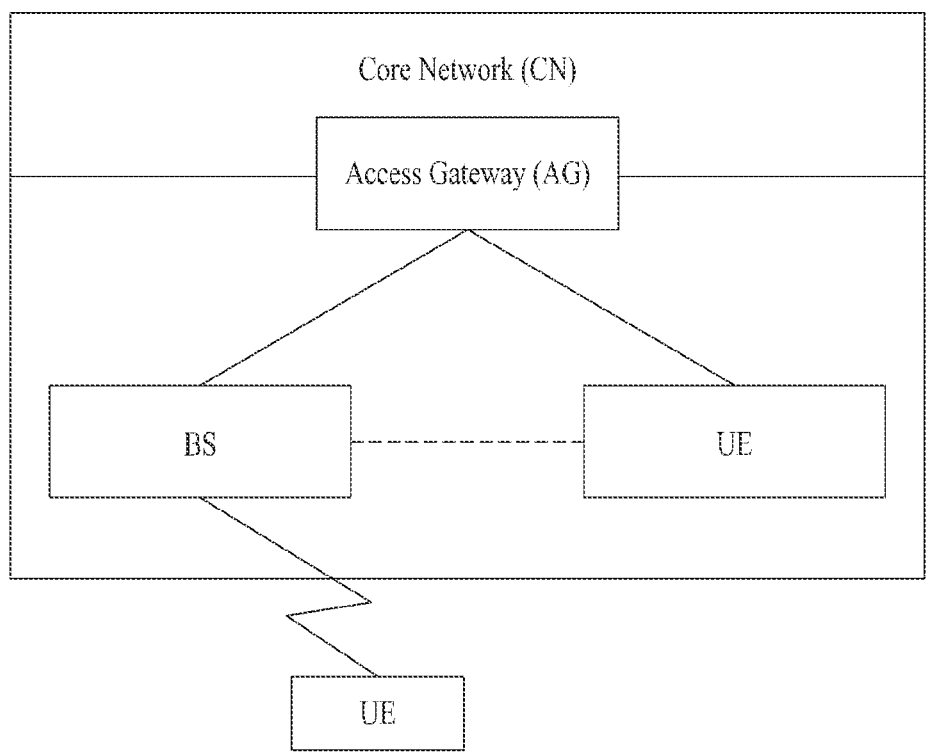
FIG. 1 illustrates a general view of an E-UMTS network structure as an example of a mobile communication system.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein. For example, although the following description will be made based on a mobile communication system corresponding to a 3GPP LTE, LTE-A system, the following description can be applied to other mobile communication systems except for the unique features of the 3GPP LTE, LTE-A system.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description, it will be assumed that UE will collectively refer to mobile or fixed user-end devices, such as a UE (User Equipment), MS (Mobile Station), AMS (Advanced Mobile Station), and so on. Additionally, it will also be assumed that the base station will collectively refer to an arbitrary node of a network end communication with the UE, such as Node B, eNode B, Base Station, AP (Access Point), and so on.

In the mobile communication station, the UE (User Equipment) may receive information from the BS via Downlink, and the UE may also transmit information via Uplink. The information being transmitted or received by the UE may correspond to data and diverse control information, and diverse physical channel exist in accordance with different purposes of the information being transmitted or received by the UE.

Figure 2:
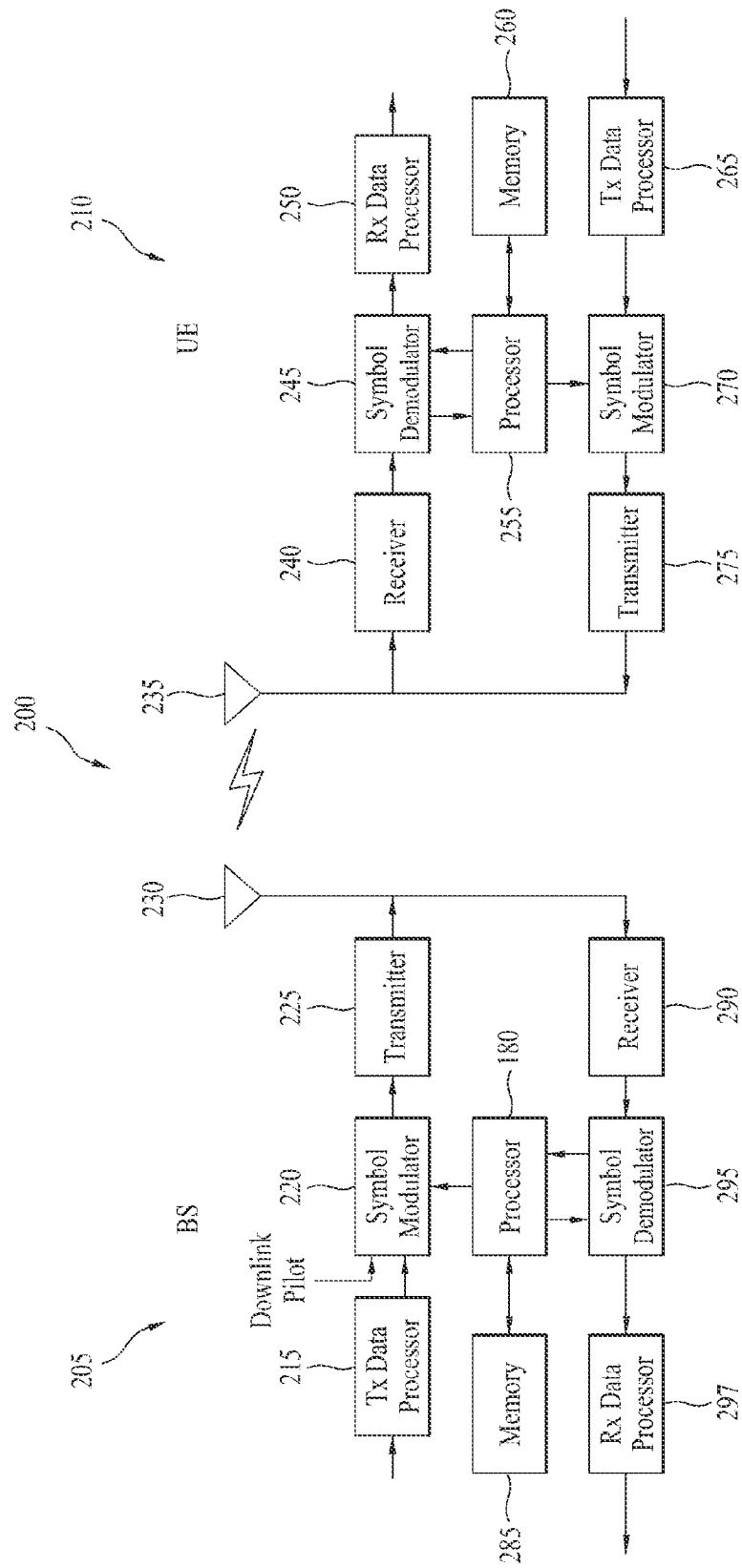
FIG. 2 illustrates structures of a base station (205) and a user equipment (210) in a wireless communication system (200).

FIG. 2 illustrates structures of a base station (205) and a user equipment (210) in a wireless communication system (200).

In order to illustrate a simplified structure of the wireless communication system (200), the wireless communication system (200) is shown to include one base station (BS) (205) and one user equipment (UE) (210). However, the wireless communication system (200) may include at least one or more BSs and/or at least one or more UEs.

Referring to FIG. 2, the BS (205) may include a transmission (Tx) data processor (215), a symbol modulator (220), a transmitter (225), a transceiving antenna (230), a processor (280), a-memory (285), a receiver (290), a symbol demodulator (295), and a reception data processor (297). And, the UE (210) may include a transmission (Tx) data processor (265), a symbol modulator (270), a transmitter (275), a transceiving antenna (235), a processor (255), a memory (260), a receiver (240), a symbol demodulator (235), and a reception data processor (250). Although it is shown in the drawing that the BS (205) and the UE (210) each includes only one antenna (230, 235), the BS (205) and the UE (210) each includes a plurality of antennae. Therefore, the BS (205) and the UE (210) according to the present invention support a MIMO (Multiple Input Multiple Output) system. Additionally, the BS (205) according to the present invention may support both SU-MIMO (Single User-MIMO) and MU-MIMO (Multi User-MIMO) schemes (or methods).

Within the downlink, the transmission data processor (215) receives traffic data, formats the received traffic data, codes the formatted traffic data, interleaves and modulates (or symbol-maps) the coded traffic data, and provides the modulated symbols ("data symbols"). The symbol modulator (220) receives and processes such data symbols and pilot symbols and provides a stream of symbols.

Use symbol modulator (220) multiplexes data and pilot symbols and transmits the multiplexed symbols to the transmitter (225). Herein, each of the transmitted symbols may correspond to a data symbol, a pilot symbol, or a signal value of zero. In each symbol cycle (or duration), the pilot symbols may be consecutively transmitted. The pilot symbols may correspond to Frequency Division Multiplexing (FDM), Orthogonal Frequency Division Multiplexing (OFDM), Time Division Multiplexing (TDM), or Code Division Multiplexing (CDM) symbols.

The transmitter (225) receives the stream of symbols and converts the received stream to at least one or more analog signals, and, also, by additionally adjusting (e.g., by amplifying, filtering, and frequency upconverting such analog signals, the transmitter (225) generates a downlink signal, which is suitable for transmission through a wireless channel (or radio channel). Accordingly, the antenna (230) transmits the generated downlink signal to the UE.

In the configuration of the UE (210), the antenna (235) receives the downlink signal from the BS and provides the received signal to the receiver (240). The receiver (240) adjusts (e.g., performs filtering, amplification, and frequency downconverting) and acquires samples by digitalizing the adjusted signals. The symbol demodulator (245) demodulates the received pilot symbols and provides the demodulated pilot symbols to the processor (225) for channel estimation.

Additionally, the symbol demodulator (245) receives a frequency response estimation value respective to the downlink from the processor (255), performs data demodulation on the received data symbols, acquires data symbol estimation values (corresponding to estimation values of the transmitted data symbols), and provides the data symbol estimation values to the reception (Rx) data processor (250). The reception data processor (250) performs demodulation (i.e., symbol demapping), deinterleaving, and decoding on the symbol estimation values, so as to recover the transmitted traffic data.

The processing of the symbol demodulator (245) and the reception data processor (250) is complementary to the processing of the symbol modulator (220) and the transmission data processor (215) in the BS (205).

The UE (210), in the uplink, the transmission data processor (265) processes traffic data and provides data symbols. The symbol modulator (270) receives and multiplexes data symbols and performs modulation, thereby being capable of providing a stream of symbols to the transmitter (275). The transmitter (275) receives and processes the stream of symbols, so as to generate an uplink signal. Thereafter, the antenna (235) transmits the generated uplink signal to the BS (205).

In the BS (205), the uplink signal is received from the UE (210) through the antenna (230), and the receiver (290) acquires samples by processing the received uplink signal. Subsequently, the symbol demodulator (295) processes the acquired samples and provides pilots symbols that are received with respect to the uplink and the data symbol estimation values. The reception data processor (297) processes the data symbol estimation values, so as to recover the traffic data, which are transmitted from the UE (210).

Each of the processors (255, 280) respectively belonging to the UE (210) and the BS (205) directs operations (e.g., control, adjustment, management, and so on) performed in each of the UE (210) and the BS (205). Each of the processors (255, 280) may be respectively connected to memory units (260, 285), which store program codes and data. The memories (260, 285) are connected to the processor (280) and store an operating system, applications, and general files.

The processor (255, 280) may also be referred to as a controller, a microcontroller, a microprocessor, a microcomputer, and so on. Meanwhile, the processor (255, 280) may be realized in the form of hardware or firmware, software, or in a combination of hardware, firmware, and/or software. In case of implementing the exemplary embodiment of the present invention to the form of hardware, ASICs (Application Specific Integrated Circuits), DSPs (Digital Signal Processors), DSPDs (Digital Signal Processing Devices), PLDs (Programmable Logic Devices), FPGAs (Field Programmable Gate Arrays), which are configured to perform the present invention, may be provided in the processor (255, 280).

Meanwhile, in case of implementing the exemplary embodiments of the present invention in the form of firmware or software, the firmware or software may be configured to include modules, procedures, or functions performing the functions or operations of the present invention, and, the firmware or software, which is configured to be capable of performing the present invention, may be equipped inside the processor (255, 280) or may be stored in the memory (260, 285) and then operated by the processor (255, 280).

Layers of a wireless interface protocol between a wireless communication system (network) of the UE and the BS may be categorized into a first layer (L1), a second layer (L2), and a third layer (L3) based upon 3 lower layers of an OSI (open system interconnection) model, which is well-known in the communication system. A physical layer corresponds to the first layer and provides information transmission service through a physical channel. An RRC (Radio Resource Control) layer belongs to the third layer and provides control radio resources between the UE and the network. The UE and the BS may exchange RRC messages with the wireless communication network through the RRC layer.

Figure 3:
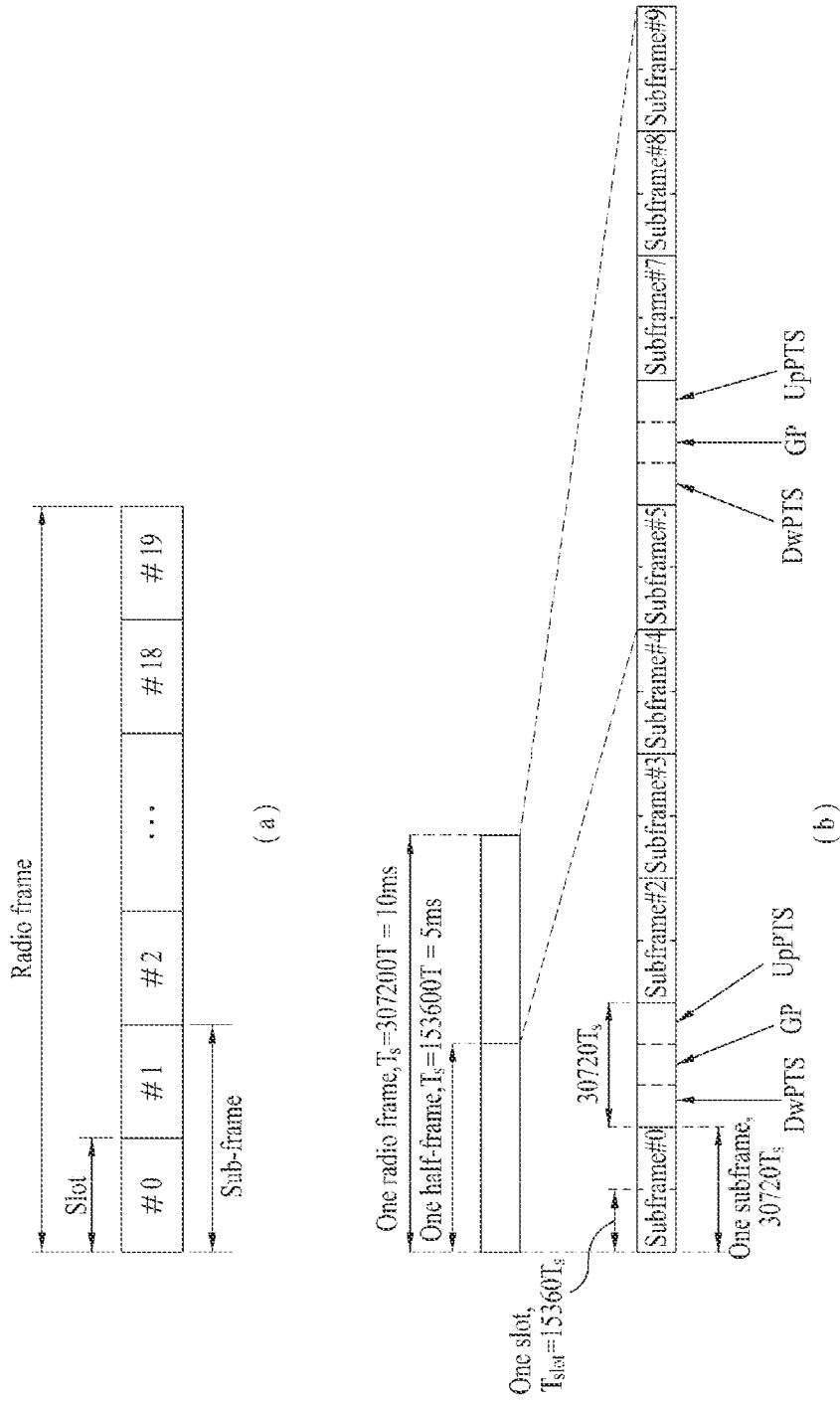
FIG. 3 illustrates an exemplary structure of a radio frame used in a 3GPP LTE/LTE-A system, which corresponds to an example of a wireless communication system.

FIG. 3 illustrates an exemplary structure of a radio frame used in a 3GPP LTE/LTE-A system, which corresponds to an example of a wireless communication system.

In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

FIG. 3(a) illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM (orthogonal frequency division multiplexing) symbols in the time domain and includes a plurality of Resource Blocks (RBs) in the frequency domain. Since the 3GPP LTE system uses the OFDMA in a downlink, an OFDM symbol indicates one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the UE is moving at high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

FIG. 3(b) illustrates an exemplary structure of a type 2 radio frame. The type 2 radio frame consists of 2 half frames, each half frame is configured of 5 subframes and a DwPTS (Downlink Pilot Time Slot), a Guard Period (GP), and a UpPTS (Uplink Pilot Time Slot), and, herein, one subframe is configured of 2 slots. The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink.

Each half frame includes 5 subframes, and the subframe marked "D" corresponds to a sub-frame designated for downlink transmission, the subframe marked "U" corresponds to a subframe designated for uplink transmission, and the subframe marked "S" corresponds to a special subframe consisting of a DwPTS (Downlink Pilot Time Slot), a Guard Period (GP), and a UpPTS (Uplink Pilot Time Slot). The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink.

In case of a 5 ms downlink-uplink switch point cycle (or duration), the special subframe (S) exists in each half-frame, and, in case of a 5 ms downlink-unlink switch point cycle (or duration), the special subframe (S) exists only in the first half-frame. Subframe indexes 0 and 5 (subframe 0 and 5) and DwPTS corresponds to a section designated only for downlink transmission. UpPTS and the subframe immediately following the special subframe always correspond to a section designated only for uplink transmission. In case multi-cells aggregated, it may be assumed that the UE is configured of the same uplink-downlink configuration throughout all cells, and the guard period of the special subframe of different cells may overlap by at least 1456 Ts. The structure of a radio frame is merely exemplary, and the number of subframes included in a radio frame, the number of slots included in a subframe, or the number of symbols included in a slot may diversely vary.

The structure of a radio frame is merely exemplary, and the number of subframes included in a radio frame, the number of slots included in a subframe, or the number of symbols included in a slot may diversely vary.

Figure 4:
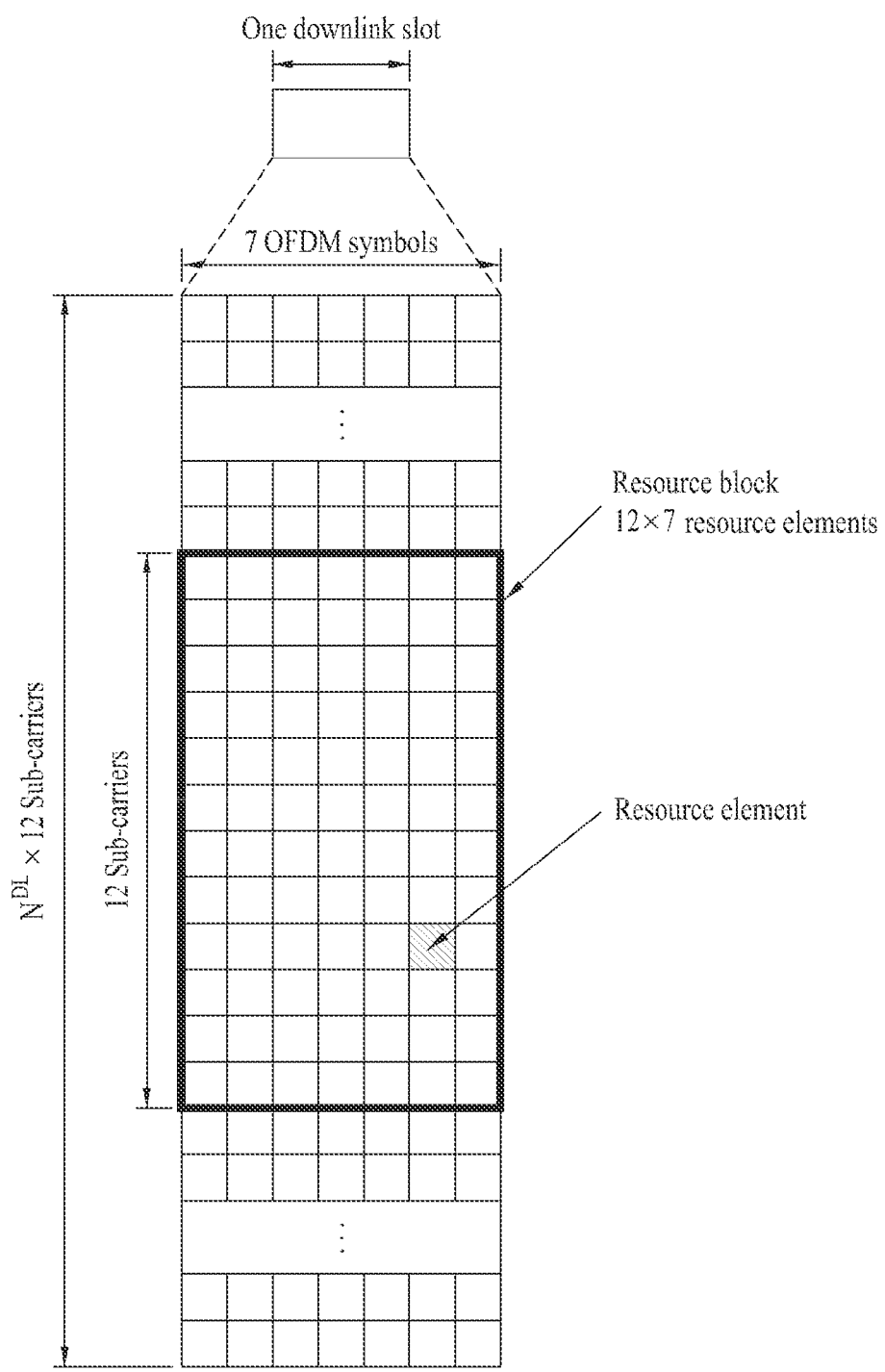
FIG. 4 illustrates an exemplary resource grid of a downlink slot of a 3GPP LTE/LTE-A system, which corresponds to an example of a wireless communication system.

FIG. 4 illustrates an exemplary resource grid of a downlink slot of a 3GPP LTE/LTE-A system, which corresponds to an example of a wireless communication system.

Referring to FIG. 4, a downlink slot includes multiple OFDM symbols in the time domain. One downlink slot may include 7 (or 6) OFDM symbols in a time domain, and a resource block (RB) may include 12 sub-carriers in the frequency domain. Each element within the resource grid is referred to as a Resource Element (RE). One RB includes 12×7(6) REs. NRB, which corresponds to the number of RBs included in a downlink slot, is dependent to a downlink transmission bandwidth. The structure of an uplink slot may be identical to the above-described structure of the downlink slot. However, the OFDM symbol may be replaced with the SC-FDMA symbol.

FIG. 5 illustrates a structure of a downlink subframe of a 3GPP LTE/LTE-A system, which corresponds to an example of a wireless communication system.

Referring to FIG. 5, a maximum of 3(4) OFDM symbols located at the front portion of a first slot within one subframe corresponds to a control region, wherein a control channel is allocated for assigned). The remaining OFDM symbols correspond to a data region, wherein a Physical Downlink Shared Channel (PDSCH) is assigned. Examples of the downlink control channels that are being used in the LTE system may include a Physical Control Format Indicator Channel (PCFICH), a Physical Downlink Control Channel (PDCCH), a Physical Hybrid automatic repeat request Indicator Channel (PHICH), and so on. The PCFICH carries information on the number of OFDM symbols being transmitted from the first OFDM symbol of a subframe and being used in the control channel transmission within the subframe. As a response to an uplink transmission, the PHICH may carry HARQ ACK/NACK (Hybrid Automatic Repeat request acknowledgment/negative-acknowledgment) signals.

The control information being transmitted through the PDCCH is referred to as DCI (Downlink Control Information). The DCI format may be defined as formats, such as Format 0 for the usage in an uplink, Formats 1, 1A, 1B, 1C, 1D, 2, 2A, 3, 3A, and so on, for the usage in a downlink. Depending upon its purpose, the DCI format selectively (or optionally) includes information on hopping flag, RB allocation, MCS (modulation coding scheme), RV (redundancy version), NDI (new data indicator), TPC (transmit power control), cyclic shift DM RS (demodulation reference signal), CQI (channel quality information) request, HARQ processing number, TPMI (transmitted precoding matrix indicator), PMI (precoding matrix indicator) confirmation, and so on.

The PDCCH may carry a transmission format and resource allocation information of a downlink shared channel (DL-SCH), a transmission format and resource allocation information of an uplink shared channel (UL-SCH), paging information of a paging channel (PCH), system information of the DL-SCH, resource allocation information of a higher-layer control message, such as a Random Access Response being transmitted over the PDSCH, a set of Tx power control commands on individual UEs within the UE group, a Tx power control command, indication information on the activation of a VoIP (Voice over IP), and so on. A plurality of PDCCHs may be transmitted within the control region. And, the UE may monitor the plurality of PDCCHs. Herein, the PDCCH may be transmitted in the form of an aggregation of one or more consecutive Control Channel Elements (CCEs). A CCE corresponds to a logical allocation unit, which is used for providing a coding rate to a PDCCH based on a radio (or wireless) channel state. Herein, the CCR corresponds to multiple resource element groups (REGs). Herein, the number of PDCCH formats and the number of available data bits may be decided in accordance with the number of CCEs. The BS may decide a PDCCH format in accordance with the DCI, which is to be transmitted to the UE, and may add a CRC (Cyclic Redundancy Cheek) to the control information. Depending upon the owner of the PDCCH or the usage purpose of the PDCCH, the CRC may be masked with an identifier (e.g., an RNTI (Radio Network Temporary Identifier). For example, if the PDCCH is designated to a particular (or specific) UE, an identifier (e.g., cell-RNTI (C-RNTI)) of the corresponding UE may be masked to the CRC. Alternatively, if the PDCCH is designated to a paging message, a paging identifier (e.g., paging-RNTI (P-RNTI)) may be masked to the CRC. If the PDCCH is designated to system information (most particularly, to a system information block (SIC)), an S-RNTI (system information RNTI) may be masked to the CRC. If the PDCCH is designated to a random access response, an RA-RNTI (random access-RNTI) may be masked to the CRC.

Figure 6:
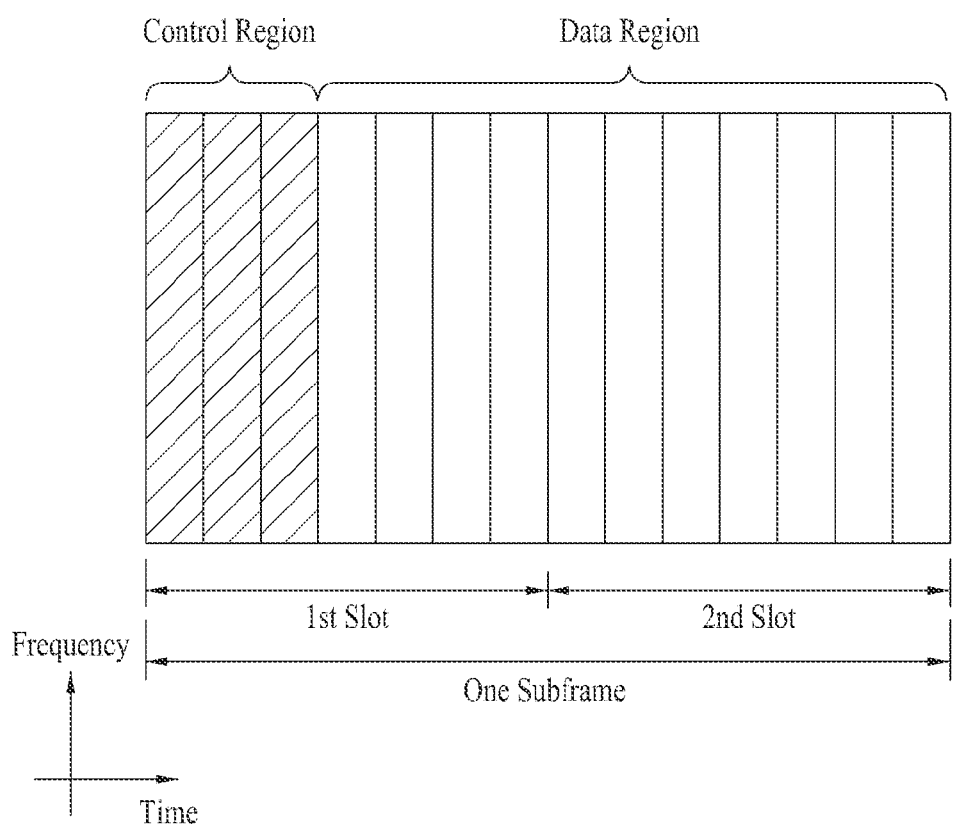
FIG. 6 illustrates a structure of an uplink subframe a 3GPP LTE/LTE-A system, which corresponds to an example of a wireless communication system.

FIG. 6 illustrates a structure of an uplink subframe a 3GPP LTE/LTE-A system, which corresponds to an example of a wireless communication system.

Referring to FIG. 6, an uplink subframe includes multiple (e.g., 2) slots. A slot may include different numbers of SC-FDMA symbols based upon a CP length. In the frequency domain, an uplink subframe may be divided into a control region and a data region. The data region includes a PUSCH and is used for transmitting data signals, such as sound. The control region includes a PUCCH and is used for transmitting Uplink Control Information (UCI). The PUCCH includes an RB pair, which is located at each end portion of the data region along the frequency axis, and may be frequency-hopped at the slot boundary.

The PUCCH may be used for transmitting the following control information.

- SR (Scheduling Request): corresponds to information that is used for requesting uplink UL-SCH resource. The SR is transmitted by using an OOK (On-Off Keying) method.
- HARQ-ACK/NACK: corresponds to a response signal for a downlink data packet within the PDSCH. The HARQ-ACK/NACK indicates whether or not the downlink data packet has been successfully received. A 1-bit ACK/NACK is transmitted as a response for a single downlink CodeWord (CW), and a 2-bit ACK/NACK is transmitted as a response for two downlink codewords.
- CQI (Channel Quality Indicator): corresponds to feedback information respective to a downlink channel. Feedback information related to the MIMO (Multiple Input Multiple Output) includes an RI (Rank Indicator), PMI (Precoding Matrix Indicator), PTI (Precoding Type Indicator), and so on. 20 bits are used for each subframe.

The amount (or size) of the control information (UCI) that can be transmitted by the UE from a subframe depends upon a number of SC-FDMAs that are available for control information transmission. The SC-FDMAs that are available for control information transmission refers to SC-FDMA symbols that remain after excluding the SC-FDMA symbol for reference signal transmission from the subframe. And, in case of a subframe having an SRS (Sounding Reference Signal) determined therein, the last SC-FDMA symbol of the subframe may also be excluded. Herein, a reference signal is used for a coherent detection of the PUCCH. The PUCCH supports 7 formats depending upon the information that is being transmitted.

Table 1 below shows a mapping relation between a PUCCH format and UCI in LTE.

TABLE 1

| PUCCH FORMAT | Uplink Control Information (UCI) |
|---|---|
| Format 1 | SR (Scheduling Request) (Non-modulated wave form) |
| Format 1a | 1-bit HARQ ACK/NACK (SR present/absent) |
| Format 1b | 2-bit HARQ ACK/NACK (SR present/absent) |
| Format 2 | CQI (20 coded bits) |
| Format 2 | CQI and 1- or 2-bit HARQ ACK/NACK (20 bits) (applies only to extended CP) |
| Format 2a | CQI and 1-bit HARQ ACK/NACK (20 + 1 coded bits) |
| Format 2b | CQI and 2-bit HARQ ACK/NACK (20 + 2 coded bits) |

FIG. 7 illustrates an exemplary Carrier Aggregation (CA) communication system.

An LTE-A system uses a carrier aggregation or bandwidth aggregation technique, which uses a larger uplink/downlink bandwidth by grouping (or gathering) multiple uplink/downlink frequency blocks in order to use a broader frequency bandwidth. Each small frequency bandwidth is transmitted by using a Component Carrier (CC). A component carrier may be understood as a carrier frequency (or central carrier, central frequency) for the respective frequency block.

Each of the CCs may be adjacent or non-adjacent to one another within the frequency domain. The bandwidth of the CC may be limited to the bandwidth of the conventional system for backward compatibility with the conventional system. For example, the conventional 3GPP LTE system supports bandwidths of {1.4, 3, 5, 10, 15, 20} MHz, and LTE_A supports a bandwidth that is larger than 20 MHz by using only the bandwidths that are supported by LTE. The bandwidth of each CC may be independently decided. Asymmetric carrier aggregation, wherein the number of UL CCs is different from the number of DL CCs, may also be used. DL CC/UL CC links may be fixed to or semi-statically configured in the system. For example, as shown in FIG. 7(a), when the number of DL CCs is equal to 4, and when the number of UL CCs is equal to 2, a DL-UL linkage configuration having a DL CC:UL CC=2:1 correspondence may be formed. Similarly, as shown in FIG. 7(b), when the number of DL CCs is equal to 2, and when the number of UL CCs is equal to 4, a DL-UL linkage configuration having a DL CC:UL CC=1:2 correspondence may be formed. Unlike what is shown in the drawing, symmetric carrier aggregation, wherein the number of DL CCs is equal to the number of UL CCs, may also be used, and, in this case, a DL-UL linkage configuration having a DL CC:UL CC=1:1 correspondence may be formed.

Additionally, even if the overall system band is configured of N number of CCs, the frequency band that can be monitored/received by a specific UE may be limited to M(<N) number of CCs. Various parameters respective to carrier aggregation may be determined by using cell-specific, UE group-specific, or UE-specific methods. Meanwhile, control information may be determined to be transmitted and/or received (or transceived) only through a specific CC. The specific CC may be referred to as a Primary CC (PCC), and the remaining CCs may be referred to as Secondary CCs (SCCs).

The LTE-A conceptually uses the concept of a cell in order to manage radio resources. The cell is defined as a combination of downlink resources and uplink resources, and the downlink resources are not mandatory. Therefore, the cell may be comprised of only DL resources or may be comprised of DL resources and UL resources. If carrier aggregation is supported, a linkage between DL resource (or DL CC) carrier frequency and UL resource (or UL CC) carrier frequency may be designated by system information. The cell operated on the primary frequency for PCC) may be referred to as a primary cell (PCell), and the cell(s) operated at a secondary frequency (or SCC) may be referred to as a secondary cell(s) (SCells).

The PCell is used for performing an initial connection establishment process is performed or a connection re-establishment process is started. PCell may also indicate the cell indicated in a handover process. A SCell may be configured after RRC connection establishment and may also be used to provide additional radio resources. PCell and SCell may be generically named as serving cells. Therefore, in the case of the UE that is in an RRC_CONNECTED state, does not establish or support carrier aggregation, there is only one serving cell composed of only PCell. In contrast, in the case of another UE that is in the RRC_CONNECTED state and establishes carrier aggregation, one or more serving cells may be present, one PCell and at least one SCell may form the entire serving cells. After the initial security activation process is started, the network may add one or more SCells to the initially configured PCell in a connection establishment process for the UE supporting carrier aggregation.

Unlike the conventional LTE system using one carrier, in carrier aggregation, which uses multiple component carriers (CCs), a method for effectively managing the component carriers has been required. In order to effectively manage to the component carriers, the component carriers may be categorized based upon function and characteristics. In carrier aggregation, multi carriers may be divided into Primary Component Carrier (PCC) and Secondary Component Carrier (SCC), and this may correspond to a UE-specific parameter.

The primary component carrier (PCC) corresponds to a component carriers that acts as central point for managing component carriers when using multiple component carriers, and, herein, one primary component carrier (PCC) is defined for each UE. The primary component carrier may perform the function of an essential carrier (or core carrier) managing the overall component carriers that are aggregated, and the remaining secondary component carriers may each perform the function of providing additional frequency resource for providing a high transmission rate. For example, an access (or connection) for performing signaling (RRC) between the BS and the UE may be realized through the primary component carrier. Security and provision of information for higher layers (or upper layers) may also be realized through the primary component carrier. Actually, in a case when only component carrier exists, the corresponding component carrier shall become the primary component carrier, and, in this case, the corresponding component carrier may perform the same function as the carrier of the conventional LTE system.

Among multiple component carriers, the BS may allocate with an Activated Component Carrier (ACC) to a UE. The UE is informed in advance of the activated component carrier (ACC), which is allocated thereto, via signaling. The UE gathers (or collects) responses respective to multiple PDCCHs, which are received from a downlink PCell and downlink SCells, and may, then, transmit the gathered response to the PUCCH through an uplink PCell.

In the LTE-A system, which corresponds to an exemplary next generation mobile communication system, the newly-designed reference signal may be divided into two different categories, which may correspond to a Channel State Information-Reference Signal (hereinafter referred to as CSI-RS) for performing channel measurement, which is used for the selection of Modulation and Coding Scheme (MCS), Precoding Matrix Index (PMI), and so on, and a DeModulation Reference Signal (DMRS) (hereinafter referred to as DMRS or DM-RS), which is used for demodulating data being transmitted through 8 transmission antennae.

In addition to being designed to have the same purpose as the conventional CRS for performing channel measurement, handover measurement, and so on, as opposed to being used for data demodulation, the characteristics of the CSI-RS for performing channel measurement are concentrated on being designed for the purpose channel measurement. Evidently, the CSI-RS may also be used for the purpose of measuring handover. Since the CSI-RS is being transmitted only for the purpose of acquiring information on the channel state, unlike the CRS, the CSI-RS is not required to be transmitted for each subframe. Therefore, in order to reduce overhead respective to the CSI-RS transmission, the BS may intermittently transmit the CSI-RS over the time axis, and, in order to perform data demodulation, the BS may transmit a UE-dedicated DMRS, which is scheduled in the corresponding time-frequency domain. More specifically, the DMRS of a specific UE is transmitted only from a domain wherein the corresponding UE is scheduled, i.e., from a time-frequency domain that can receive data.

In the LTE-A system, the BS may transmit CSI-RS for all antenna ports. However, when the BS transmits CSI-RS respective to a maximum of 8 transmission antenna ports for each subframe, this may cause the problem of having an excessively large overhead. And, therefore, instead of transmitting the CSI-RS for each subframe, the BS may reduce the overhead by intermittently transmitting the CSI-RS along the time axis. More specifically, the BS may periodically transmit the CSI-RS at a cycle period corresponding an integer multiple of one subframe or may transmit the CSI-RS in a specific transmission pattern. At this point, the BS may configure a transmission cycle or pattern of the CSI-RS and may notify the UE of the configured transmission cycle or pattern.

In order to measure the CSI-RS, the UE is required to be aware of information on time-frequency location of the CSI-RS, CSI-RS sequence, CSI-RS frequency shift, and so on, respective to each antenna port of the cell to which the corresponding UE belongs. Since the CSI-RS is transmitted for the purpose of knowing downlink channel information, unlike the DRS, the CSI-RS shall be transmitted throughout the entire band. The UE may feed-back channel information, such as CQI, PMI, Rank, and so on, of each band by using the received CSI-RS, and the BS may perform scheduling operations by using the fed-back channel information.

Meanwhile, in order to enhance the data transmission rate, the LTE-A system supports a CoMP (Coordinated Multi Point) method and a Multi User-MIMO (MU-MIMO) method, which were not supported in the conventional system. Herein, the CoMP system refers to a system having two or more BSs or cells being coordinated to one another and communicating with the UE, in order to enhance the communication performance between the UE and BS (cell or sector), which exist in a shadow region.

The CoMP method may be divided into a CoMP-Joint Processing (CoMP-JP) method of a coordinated MIMO format via data sharing and a CoMP-Coordinated Scheduling/beamforming (CoMP-CS/CB) method.

In the joint processing (CoMP-JP) method, in case of the downlink, the UE may instantly receive data simultaneously from each BS performing CoMP, and, by combining the signals received from each BS, the receiving performance may be enhanced. Conversely, in the Coordinated Scheduling/beamforming (CoMP-CS/CB) method (CoMP-CS), the UE may instantly receive data via beamforming from one BS.

In the joint processing (CoMP-JP) method, in case of the uplink, each BS may simultaneously receive PUSCH signals from the UE. Conversely, in the Coordinated Scheduling/beamforming (CoMP-CS/CB) method (CoMP-CS), only one BS receives the PUSCH, and, at this point, the decision to use the Coordinated Scheduling/beamforming (CoMP-CS/GB) method is made by the coordinated cells (or BSs).

The MU-MIMO technology relates to having the BS allocate each antenna resource to another UE, wherein a UE capable of providing a high-speed data transmission rate for each antenna is selected and scheduled. Such MU-MIMO method Corresponds to a technology that can enhance system throughput.

Within such CoMP environment, in the UE, the channel quality between the UE and the cell may vary depending upon the movements of the UE. More specifically at a specific time point, with respect to the UE, a cell having channel quality that is greater than the channel quality between the UE and the cell, to which the UE is presently belongs, may appear. And, when a cell having more excellent channel quality as compared to the channel quality between the UE and the cell to which the UE belongs appears for more than a predetermined period of time, the UE may communicate with the cell having the more excellent channel quality. As described above, in order to perform cell re-selection or handover, the UE may consistently measure and monitor channel quality states of the cell, to which the corresponding UE currently belongs to, and of neighboring cells, which are located in the surrounding area of the current cell, at constant intervals.

In the LTE and LTE-A systems, the UE may measure the channel quality state between the UE itself and the respective cell by using a Reference Signal Received Power (RSRP), which corresponds to the power of a pilot signal. The RSRP refers to a linear average of power that is distributed to resource elements being allocated with a cell-specific reference signal within a measurement frequency bandwidth. The power of each resource element within a resource block may be decided from energy that is received from a valid interval (or section) of a symbol excluding a CP (Cyclic Prefix). The above-described RSRP may be applied to the UE being in both an RRC_idle state and an RRC_connected state. Additionally, in case transmitter diversity is being used by the UE, reported values may be equivalent to the linear average of the power values corresponding to al diversity branch.

By accumulating pilot signals transmitted by each cell with respect to a designated time and the corresponding bandwidth, the UE may measure the RSRP of the cell. In an environment where the cell, to which the UE belongs, and its neighboring cell exists, the UE may measure the RSRP of the cell, to which the UE belongs, and the RSRP of the neighboring cell in accordance with the information sent from the BS.

As a procedure for having the UE of the LTE system perform cell re-selection in an RRC_idle situation, when the UE receives a list of neighboring cells that are to be monitored from the BS, the UE may measure channel quality of all cells included in the list at pre-decided intervals and may report the measured channel quality accordingly. If the list of neighboring cells that are to be monitored is not received from the BS, the UE may randomly measure the channel quality of a cell with respect to an intra BS neighboring cell (a neighboring cell using the same carrier frequency (intra frequency neighbor cell)), an inter BS neighboring cell (a neighboring cell using a different carrier frequency (inter frequency neighbor cell)), and a neighboring cell using another system (inter RAT neighbor cell), and the UE may report the measurement to the BS only when an event related to cell re-selection occurs. In case the list of neighboring cells that are to be monitored is not received from the BS, the cell to which the UE belongs may transmit information on the carrier frequency and system respective to the neighboring cell.

In the above-described cell re-selection or handover situation, and in case the channel quality is equal to or greater than a specific threshold value, the UE may observe the neighboring cell, and, in case the channel quality is degraded and becomes lower than the threshold value, it is preferable for the UE to observe the neighboring cell.

In an RRC_connected situation, the UE may perform handover operations that are similar to the cell re-selection procedure. Just as the cell re-selection procedure, when the channel quality is greater than the threshold value, the channel quality of the neighboring cell may be observed. When the channel quality of the cell to which the UE belongs and the channel quality of its neighboring cell are measured and compared to one another, if the compared result meets with an event for handover, the UE may report this result to the network. When it is determined by the network that handover is required, the network transmits a radio link configuration message, which corresponds to an authorization message directing the UE to receive a service from the neighboring cell, and, in accordance with the received message, the UE may replace the cell from which service is currently being received to the neighboring cell, and, then, the UE may transmit a radio link configuration completion message, which corresponds to a completion message respective to replacement process, to a higher layer (e.g., BS). Thus, the handover procedure may be completed. An E-UTRAN (Evolved-Universal Terrestrial Radio Access Network) provides measurement configuration information that can be applied to the UE in the RRC_Connected state through a dedicated channel by using a message, such as, for example, RRCConnectionReconfiguration. The UE may report information matching with the measurement reconfiguration information, which is provided by the E-UTRAN.

Additionally, in the LTE and LTE-A systems, the UE may measure a channel quality state between the UE itself and its cell by using Reference Signal Received Quality (RSRQ), which corresponds to an intensity of the pilot signal. Herein, the RSRQ is defined as RSRP×N/E-UTRA carrier RSSI. Herein, N indicates a number of RBs of an E-UTRA carrier RSSI specific bandwidth.

E-UTRA carrier RSSI (Received Signal Strength indicator) includes a linear average of the total reception power, and the E-UTRA carrier RSSI is measured only in an OFDM symbol, which includes reference signals respective to antenna port $0$ and which as passed through N number of resource blocks (RBs) by the UE from all resources within the measured bandwidth, and, herein, the measurement unit corresponds to w units, and the E-UTRA carrier RSSI includes co-channel serving and non-serving cells, neighboring channel interference, thermal interference, and so on. If RSRQ measurement is directed to be performed on specific subframes via higher layer signaling, the RSSI performs measurement on all OFDM-symbols within the directed specific subframes. Additionally, in case receiver diversity is used by the UE, the reported value is not smaller than the corresponding RSRQ of an individual arbitrary diversity branch. Contents related to the RSRQ may be applied to both an RRC_idle state and an RRC_Connected state of the UE.

Limited Radio Link Monitoring and Radio Resource Management/CSI Measurement

As a method of interference coordination, an aggressor cell uses a silent subframe (or also referred to as an almost blank subframe (ABS)), which reduces transmission power/activity (including an operation of setting the power to zero power) of a portion of the physical channel, and a victim cell may consider this, thereby enabling time domain inter-cell interference coordination, which schedules the UE. In this case, in light if the victim cell UE, the interference may change significantly in accordance with the subframe, and, in such situation, in order to perform radio resource management (RRM) operations, which perform radio link monitoring (RLM) or measures RSRP/RSRQ, and so on, more accurately or in order to measure CSI for link adaptation, it will be required to limit the monitoring/measurement to sets of subframes having uniform interference characteristics.

When the UE performs radio resource management (RRM) operations respective to nodes configuring the network, as a method enabling adequate operations to be realized in the network, by using a CSI-RS, which is transmitted for measuring channel state information (CSI), the present invention proposes a method enabling RRM management to be easily realized.

Figure 8:
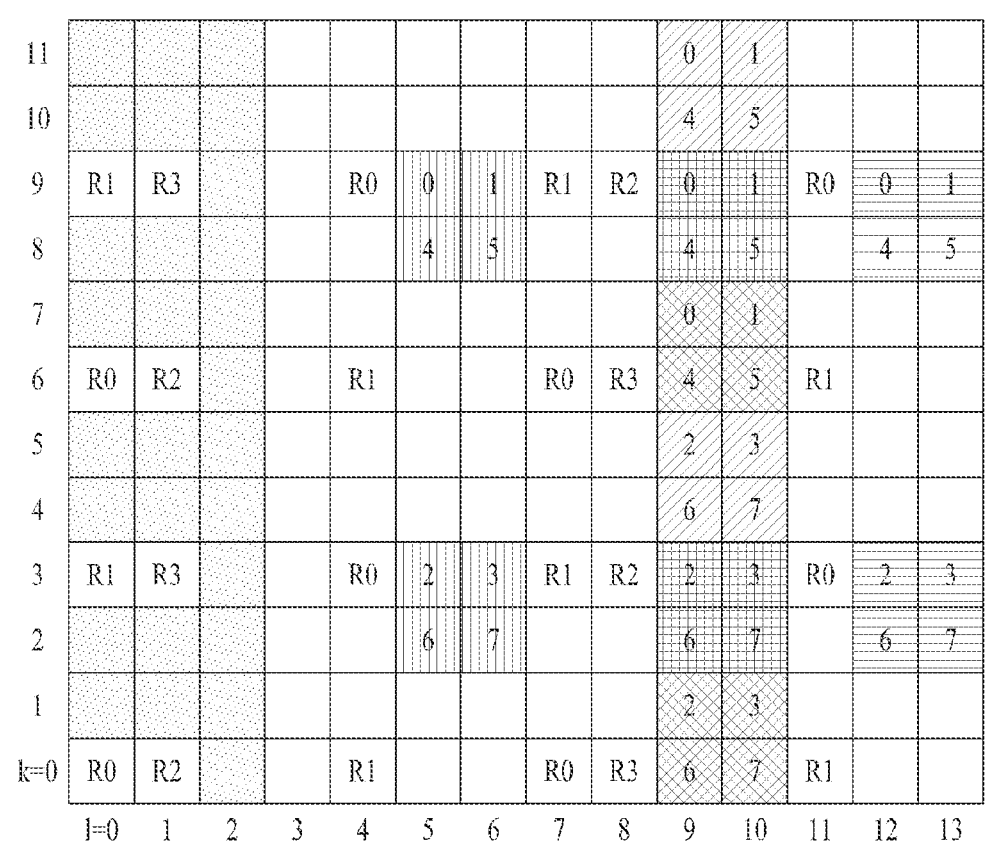

FIG. 8 illustrates patterns of a CRS and a CSI-RS having 8 ports.

Referring to FIG. 8, l indicates an OFDM symbol index, and k represents a subcarrier index. The CRS (R0, R1, R2, R3) respective to 4 antenna ports may be allocated so that time and frequency resources can be prevented from being overlapped in 1 RB. Since one RB is configured of 12 REs along the frequency axis, in case of REs respective to one antenna port, 2 REs are used for each RB.

Additionally, FIG. 8 illustrates a pattern of a CSI-RS having 8 ports, and, herein, the RS respective to one port is dispersed throughout two OFDM symbols and transmitted, and two RSs share two REs and are identified (or differentiated) by using an orthogonal code.

For example, in FIG. 8, the REs that are expressed by using numbers 0 and 1 respectively signify two REs, wherein CSI-RS ports 0 and 1 are transmitted. In the present invention, although expressions such as CSI-RS ports 0 and 1 are used for simplicity in the description, in order to be differentiated from other RS types, such as CRS or USspecific RS (e.g., DMRS), CSI-RS ports 0, 1, and so on, may have indexes, such as ports 15, 16, and so on. In addition to being configured of 8 ports, CSI-RS may also be configured to have 1 port, 2 ports, 4 ports. AS described above, generally, instead of being transmitted from each subframe, the CSI-RS may be intermittently from some of the subframes.

Figure 9:
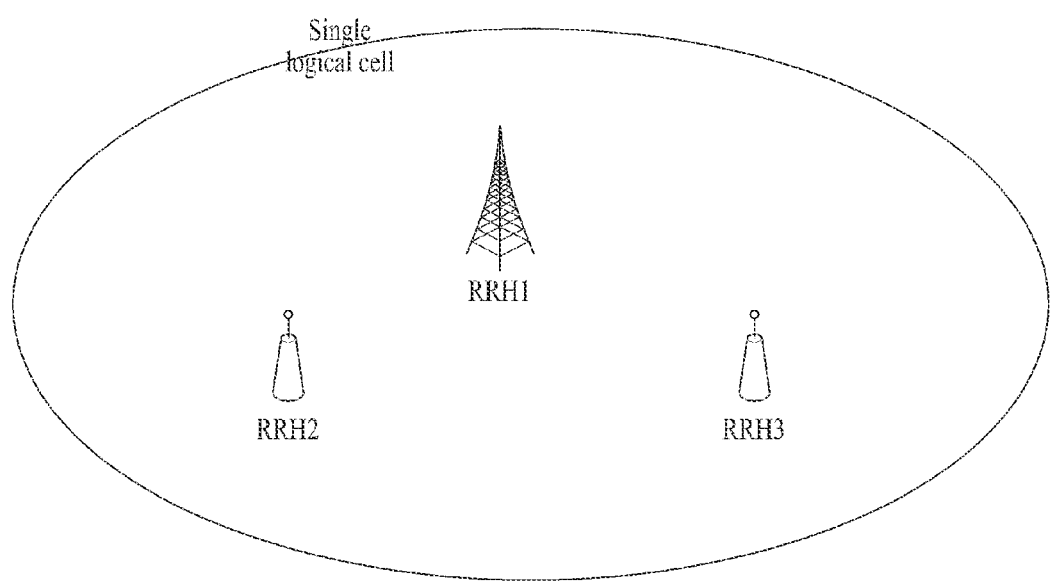
FIG. 9 illustrates an exemplary network including a plurality of radio remote heads (RRHs) in a single cell.

FIG. 9 illustrates an exemplary network including a plurality of radio remote heads (RRHs) in a single cell.

As shown in FIG. 9, when multiple RRHs existing in different geographical locations each has the same cell ID (Identifier) and is configured of a single logical, cell, a CSI-RS based RRM is effective in performing individual RRM for each RRM. Since multiple RRHs are sharing the same cell ID, although the RRHs cannot be identified (or differentiated from one another), the CSI-RS may be configured to have an individual RRM transmit an independent RS, and, therefore, the CSI-RS based RRM becomes effective.

FIG. 9 shows a case when three RRHs (RRH1, RRH2, RRH3) share the same cell ID and configure a single cell, and, herein, it is assumed that RRH1 has a high transmission power just as a general macro BS, whereas the remaining two RRHs (RRH2, RRH3) each has low transmission power just as a pico BS or femto BS. For example, the transmission power of RRH1 is greater than a predetermined threshold value, and the transmission power of RRH2 and RRH3 are each lower than the threshold value.

Additionally, it is also assumed that each of RRH1 independently transmits CSI-RS1, RRH2 independently transmits CSI-RS2, and RRH3 independently transmits CSI-RS3, as the CSI-RS. As described above, in a heterogeneous network, nodes such as RRH2 and RRH3 (e.g., Pico BSs) may indicate BSs different from that of RRH1 (e.g., macro BS) and each RRH operates as an independent BS and cooperate with one another. Each BS of such a multi BS coordinated system or the femto/pico cell coordinated system is connected to one another through a backbone network, and by collectively performing scheduling and/or handover, a coordinated transmission/reception is performed. In FIG. 9, each RRH may be configured as a CoMP measurement set.

Meanwhile, RRH2 and RRH3 may correspond to an RRH (Remote Radio Head) having distributed antennae and low-power in a distributed antenna system (DAS), and, as a node performing communication by performing coordinated operations with a macro BS, RRH2 and RRH3 may each be referred to as a "coordinated node". Additionally, such coordinated node may also be diversely referred to as a point, a reception point, a transmission point, and so on. Hereinafter, the distributed antenna system (DAS) and the RRH will be briefly described.

DAS uses multiple distributed antenna, which are connected to one BS or one BS controller controlling multiple antennae positioned at predetermined intervals within an arbitrary geographical area (also referred to as a cell) through a cable or dedicated line, when performing communication. In the DAS each antenna or each antenna group may correspond to a coordinated node of the present invention, and each antenna of the DAS may operate as a subset of an antenna, which is equipped in one BS or one BS controller. More specifically, the DAS corresponds to a multiple node system type, and the distributed antennae or antennae group corresponds to a node type within the multiple node system. In the DAS, the fact that the multiple antennae provided in the DAS are positioned within the cell at constant intervals is differentiated from a centralized antenna system (CAS), wherein multiple antennae are concentrated at the center of the cell. The fact that all antennae located in the cell are managed by a BS or a BS controller at the center of the cell, instead of being managed by distributed antennae or a distributed antenna group, differentiates the DAS from a femto/pico cell coordinated system. Additionally, in the DAS, the fact that the distributed antennae are connected to one another through a cable or a dedicated line differentiates the DAS from a relay system or ad-hoc network, which uses a BS being connected to a relay station (RS) via wireless connection. Furthermore, in the DAS, the fact that the distributed antennae or distributed antennae group can transmit a signal that is different from the signal of other distributed antennae or another distributed antennas group to a UE, which is located near the corresponding antenna or antenna group, in accordance with a command of the BS or BS controller, differentiates the DAS from a repeater, which simply amplifies a signal and transmits the amplified signal.

The RRH separates an RF Transceiver and a power amp from the BS and installs then in a location near the antennae, so that the antennae can operate in coordination with the BS. Due to the above-described configuration, the distance between the UE and the BS antennae may be reduced, thereby increasing radio capacity and minimizing resources required for increasing the number of BSs. As described above, the RRH may perform the function of a relay station, which is independent from the BS, which separates a radio unit of the BS, and which transceives audio and data.

For example, a case when multiple nodes (or points) exist within a macro cell will be assumed. Herein, although seen multiple nodes may be diversely referred to as a coordinated RRH set, a measurement RRH set, a transmission point set, a reception set, and so on, the functions of the multiple nodes are identical to the above-described function of the RRH.

As shown in the example of FIG. 9, in case the transmission power of each RRH is not constant (or identical), when the UE receives signals from RRH2 and RRH3, which have low power, may experience an intense interference from RRH1, which has a high power. As a method for resolving such problem, in resources providing service to the UE, which is vulnerable to the interference caused by RRH2 and RRH3, it will be preferable for the RRH1 to perform a muting operation during which the RRH1 does not perform signal transmission.

More specifically, in resources where the RRH1 does not transmit any signals, the RRH2 and RRH3 may schedule the UE, which is vulnerable to interference. In order to determine whether or not such muting operation is adequate, the UE is required to report the quality of the service that can be received from RRH2 or RRH3, when RRH1 performs the muting operation. More specifically, in a situation when the RRH1 performs the muting operation, the UE reports the measured RSRP or RSRQ to RRH1, and, based upon the received report, the network decides whether or not the muting operation should be performed with respect to the corresponding UE.

However, in order to allow the RRM to be easily performed in the UE, the network is required to consistently notify the UE of the resource that performs muting and to direct the UE to perform the RRM. In the above-described general muting operation, since the application of the muting operation may vary very dynamically in accordance with traffic load, and so on, it is difficult to find a resource that can consistently perform muting for such RRM.

Accordingly when RRM is performed based upon the CSI-RS, as described above, the present invention proposes that the UE should perform RRM measurement only in a resource having CSI-RS transmitted thereto. Herein, a resource having CSI-RS transmitted thereto refers to a subframe, OFDM (Orthogonal Frequency Division Multiplexing) symbol, or RE to which the RRH transmits its own CSI-RS, wherein the RRH itself corresponds to the measurement target, and, herein, this indicates that the UE measures RSRP or RSSI with respect to such subframe, OFDM symbol, or RE.

More specifically, the RSSI that is measured by the UE for the RSRQ report will hereinafter be described with reference to FIG. 10. The UE measures the intensity of all signals from a resource having the CSI-RS of the measurement target RRH transmitted thereto and defines the measured signals as foe RSSI, thereby guiding the next RSRQ. Although it has already been described above, the measurement is defined as RSRQ=RSRP×N/E-UTRA carrier RSSI.

Figure 10:
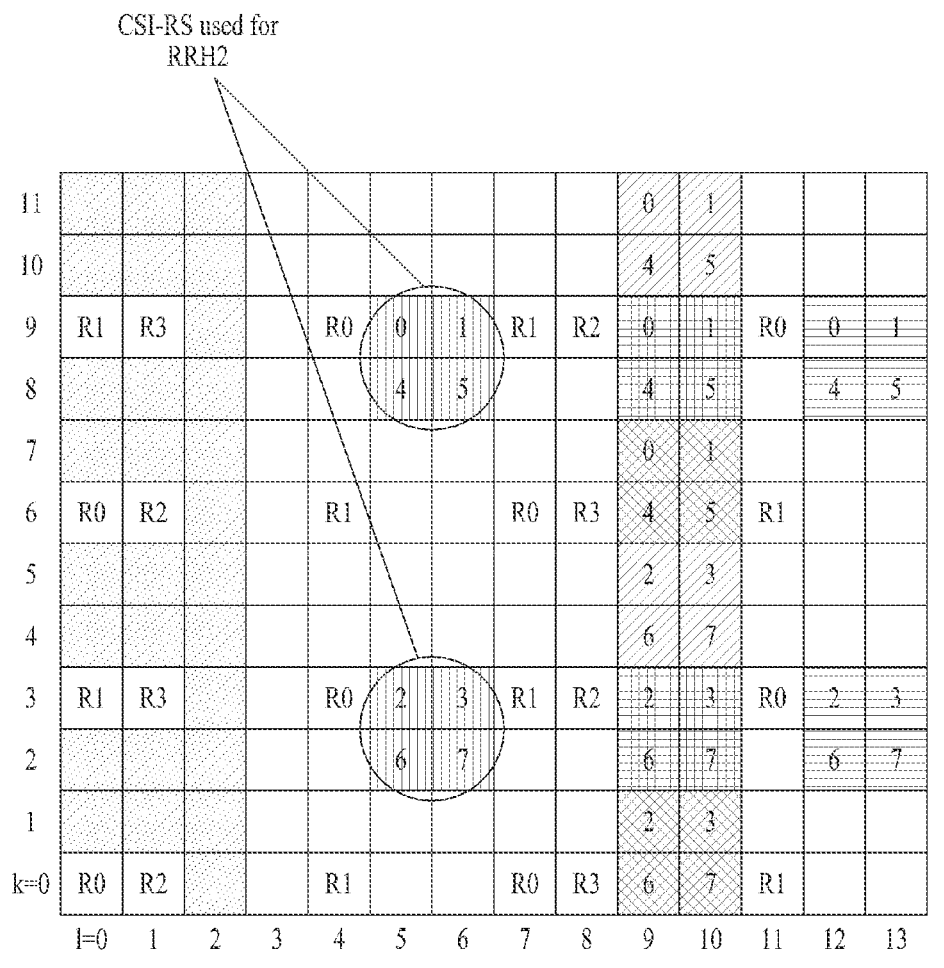

FIG. 10 illustrates exemplary patterns of a CRS and a CSI-RS being transmitted by a specific RRH.

According to an exemplary embodiment, when the measurement target RRH2 transmits a CSI-RS, which is indicated in a circular shape in FIG. 10, the UE measures the RSSI by using only the symbols corresponding to OFDM symbol indexes 5 and 6.

According to another exemplary embodiment, when the measurement target RRH (e.g., RRH2) transmits a CSI-RS, which is indicated in a circular shape in FIG. 10, the UE measures the RSSI by using the frequency domain (e.g., only the subcarriers corresponding to subcarrier indexes 2, 3, 8, 9) within the symbols corresponding to OFDM symbol indexes 5 and 6. Most particularly, such resource-limited RSSI measurement is very effective when RRH1, which performs muting operations, configures a zero power CSI-RS in the corresponding resource. And, in order to operate without causing interference on the CSI-RS of another RRH, RRH1 may semi-statically configure a zero power CSI-RS in a resource transmitting CSI-RS. As a result, in the resource having the CSI-RS of another RRH transmitted performs semi-static muting operations. Therefore, when the RSSI is measured from the corresponding resource, the UE may perform RRH measurement in a situation when RRH1 is always performing muting.

Figure 11:
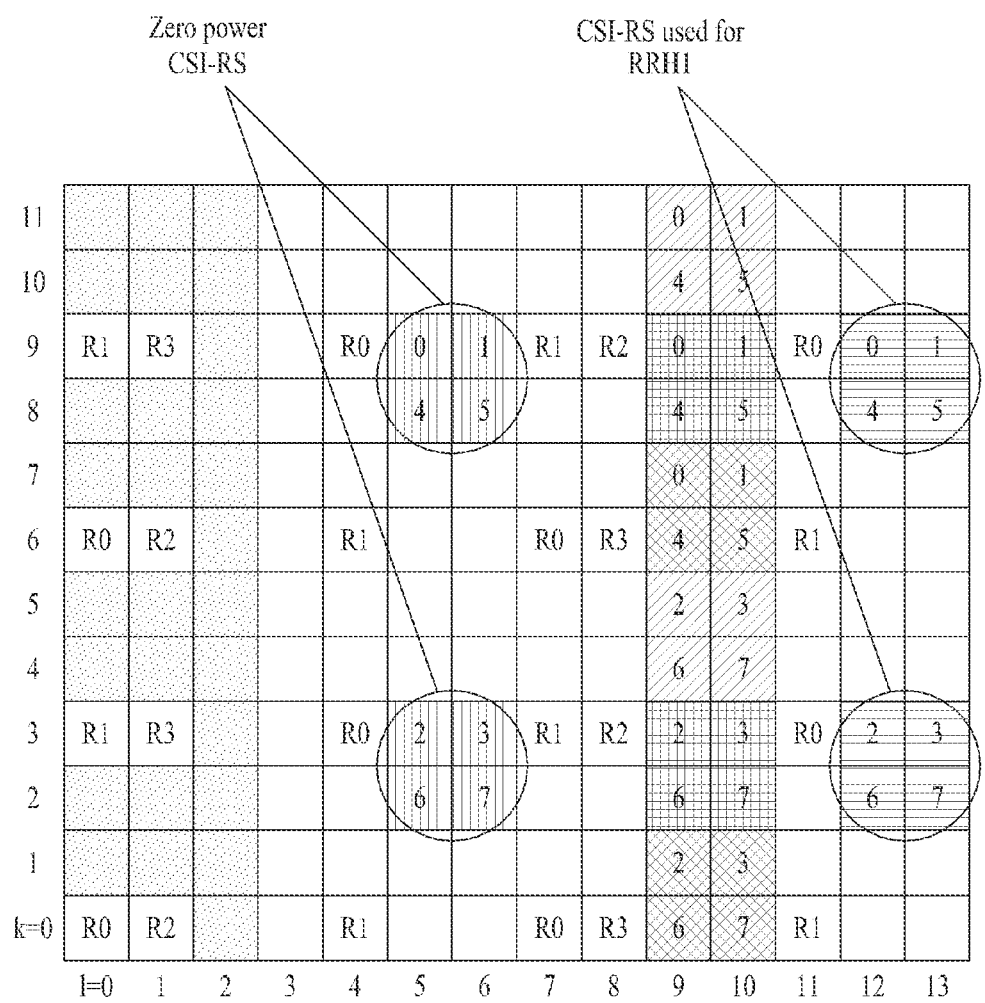
FIG. 11, illustrates exemplary patterns of a CRS, a zero power CSI-RS and a Non-zero power CSI-RS in the perspective of RRH 1.

FIG. 11 illustrates exemplary patterns of a CRS, a zero power CSI-RS and a Non-zero power CSI-RS in the perspective of RRH 1.

The CSI-RS pattern shown in FIG. 11 corresponds to a CSI-RS pattern seen from the perspective of RRH1, and, within the symbols corresponding to OFDM symbol indexes 5 and 6, the CSI-RS pattern is configured so that a zero power CSI-RS can be transmitted.

When comparing FIG. 10 with FIG. 11, RRH2 transmits CSI-RS by using subcarriers corresponding to subcarriers indexes 2, 3, 8, 9 within symbols corresponding to OFDM symbol indexes 5 and 6, and RRH 1, which, causes an intense interference on RRH 2, sets up a zero power CSI-RS at a position corresponding to a position where RRH 2 transmits the CSI-RS. Therefore, according to the exemplary embodiment of the present invention, by having the UE measure RSRP, RSSI, RSRQ by using only resource elements having the CSI-RS of RRH2 transmitted, RRM measurement respective to RRH2 may be performed in a situation where no interference of RRH 1 exists.

In the above-described example, according to yet another exemplary embodiment of the present invention, when the UE performs RRM measurement only in an OFDM symbol having the CSI-RS of RRH 2 transmitted, RRH1 may be capable of performing RRM measurement respective to RRH2 in a situation, where interference from RRH 1 is reduced, due to the zero power CSI-RS, which is set up in the corresponding OFDM symbol.

As a variation of an exemplary embodiment of the present invention, wherein RRM measurement is performed only in an OFDM symbol having a CSI-RS transmitted, operations may be performed so that RRSI can be measured from an OFDM symbol having a large number of CSI-RS patterns co-existing therein, e.g., in symbols corresponding to OFDM symbol indexes 9 and 10 of FIG. 11. In case this method is applied, it will be advantageous in that it will be easier for the UE to be operated, since the OFDM symbol having its RRSI measured in the RRM using CSI-RS is fixed. In this case, it will be advantageous to have the RRH 1 set up a zero power CSI-RS configuration with respect to the symbols corresponding to OFDM symbol indexes 9 and 10, so as to protect the CSI-RS of the RRH that receives interference.

As described above, the RSRP or RSSI may be measured within a resource having RRH 2 and/or RRH 3 of the UE transmit the CSI-RS, and RSSQ may be calculated from the measurement. At this point, the UE may report the measured RSRP, RSSI or the calculated RSRQ to RRH 1, or the UE may report a combined form of the three results to RRH 1.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics, of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

The method for measuring a state of channel quality in a wireless communication system including cells formed with a plurality of network nodes, and the apparatus therefor may be industrially applied to diverse mobile communication system, such as the 3GPP LTE, LTE-A systems.

What is claimed is:

1. A method of measuring a channel state by a user equipment in a network including a plurality of network nodes, the method comprising:
receiving, from a network, channel state information-reference signal (CSI-RS) transmission pattern information,
wherein the CSI-RS transmission pattern information indicates two orthogonal frequency division multiplexing (OFDM) symbols in a first slot of a subframe and at least two OFDM symbols in a second slot of the subframe are configured for CSI-RS transmission;
receiving, from the network, information indicating the two OFDM symbols in the first slot of the subframe on which a muting operation will be performed for the user equipment;
receiving channel state information-reference signals (CSI-RSs) of a first type network node in corresponding resource elements (REs) of the two OFDM symbols in the first slot of the subframe,
wherein CSI-RSs of a second type network node are configured as zero-power CSI-RSs in the corresponding REs of the two OFDM symbols in the first slot of the subframe, and
wherein the CSI-RSs of the second type network node are configured as non-zero power CSI-RSs on at least two OFDM symbols in the second slot of the subframe;
receiving the CSI-RSs of the second type network node in at least two OFDM symbols in the second slot of the subframe;
measuring a channel state of the first type network node for the corresponding REs of the two OFDM symbols in the first slot of the subframe; and
transmitting information related to the measured channel state to the second type network node.

2. The method of claim 1, wherein the first type network node comprises a pico base station or a femto base station.

3. The method of claim 1, wherein the second type network node comprises a macro base station.

4. The method of claim 1, wherein the measured channel state is represented as a Reference Signal Received Power (RSRP) or a Received Signal Strength Indicator (RSSI).

5. The method of claim 1, wherein the first type network node and the second type network node have a same cell Identifier (ID).

6. A user equipment for measuring a channel state in a network including a plurality of network nodes, the user equipment comprising:
a receiver configured to
receive, from a network, channel state information-reference signal (CSI-RS) transmission pattern information;
wherein the CSI-RS transmission pattern information indicates two orthogonal frequency division multiplexing (OFDM) symbols in a first slot of a subframe and at least two OFDM symbols in a second slot of the subframe are configured for CSI-RS transmission;
receive, from the network, information indicating the two OFMD symbols in the first slot of the subframe on which a muting operation will be performed for the user equipment;
receive channel state information-reference signals (CSI-RSs) of a first type network node in corresponding resource elements (REs) of the two OFDM symbols in the first slot of a subframe,
wherein CSI-RSs of a second type network node are configured as zero-power CSI-RSs in the corresponding REs of the two OFDM symbols in the first slot of the subframe, and
wherein the CSI-RSs of the second type network node are configured as non-zero power CSI-RSs on at least two OFDM symbols in the second slot of the subframe; and
receive the CSI-RSs of the second type network node in at least two OFDM symbols in the second slot of the subframe;
a processor configured to measure a channel state of the first type network node for the corresponding REs of the two OFDM symbols in the first slot of the subframe; and
a transmitter configured to transmit information related to the measured channel state to the second type network node.

7. The user equipment of claim 6, wherein the measured channel state is represented as a Reference Signal Received Power (RSRP) or a Received Signal Strength Indicator (RSSI).

8. The method of claim 1, wherein OFDM symbol indexes of the two OFMD symbols in the first slot of the subframe comprise OFDM symbol indexes 5 and 6.

9. The method of claim 1, wherein OFDM symbol indexes of the at least two OFMD symbols in the second slot of the subframe comprise at least OFDM symbol indexes 12 and 13.

10. The user equipment of claim 6, wherein OFDM symbol indexes of the two OFMD symbols in the first slot of the subframe comprise OFDM symbol indexes 5 and 6.

11. The user equipment of claim 6, wherein OFDM symbol indexes of the at least two OFMD symbols in the second slot of the subframe comprise at least OFDM symbol indexes 12 and 13.

* * * * *